United States Patent [19]

Black

[11] Patent Number: 5,020,115
[45] Date of Patent: May 28, 1991

[54] METHODS AND APPARATUS FOR DYNAMICALLY SCALING IMAGES

[75] Inventor: David B. Black, Ridgewood, N.J.

[73] Assignee: Imnet Corporation, Pine Brook, N.J.

[21] Appl. No.: 389,460

[22] Filed: Jul. 10, 1989

[51] Int. Cl.[5] ............................................. G06K 9/32
[52] U.S. Cl. .................................... 382/44; 358/451; 358/453
[58] Field of Search ............................ 382/47, 46, 44; 358/451, 453

[56] References Cited

U.S. PATENT DOCUMENTS

| | | | |
|---|---|---|---|
| 3,289,164 | 11/1966 | Rabinow | 340/146.3 |
| 3,456,817 | 7/1969 | Irazoqui | 214/16.4 |
| 4,025,176 | 5/1977 | Lopata | 353/26 A |
| 4,275,450 | 6/1981 | Potter | 382/47 |
| 4,447,882 | 5/1984 | Walz | 364/521 |
| 4,496,983 | 1/1985 | Takenaka | 358/287 |
| 4,573,201 | 2/1986 | Hashiyama et al. | 382/56 |
| 4,602,333 | 7/1986 | Komori | 364/414 |
| 4,654,877 | 3/1987 | Shimoni et al. | 382/56 |
| 4,665,555 | 5/1987 | Alker et al. | 382/41 |
| 4,707,153 | 11/1987 | Nishi et al. | 400/121 |
| 4,707,742 | 11/1987 | Field et al. | 358/183 |
| 4,747,154 | 5/1988 | Suzuki et al. | 382/47 |
| 4,791,680 | 12/1988 | Yokoe et al. | 382/56 |
| 4,807,020 | 2/1989 | Hiorsawa et al. | 358/75 |
| 4,819,190 | 4/1989 | Hinman et al. | 364/521 |
| 4,829,453 | 5/1989 | Katsuta et al. | 364/521 |
| 4,893,258 | 1/1990 | Sakuragi | 382/47 |
| 4,907,171 | 3/1990 | Nagashima | 358/451 |

*Primary Examiner*—David K. Moore
*Assistant Examiner*—Michael R. Cammarata
*Attorney, Agent, or Firm*—Robert O. Nimtz

[57] ABSTRACT

An image processing system is disclosed in which the various image processing circuits are arranged in a pipeline such that the output of each circuit is passed on to the next circuit in the pipeline without storing the data between circuits of the pipeline. The individual processing circuits are program-controlled by a common controller in order to properly synchronize various operations such as scanning, compressing, expanding, rescaling, windowing and rotating. The rescaling operation is carried out by executing a sequence of program instructions applying to single pixels, or to single lines of the image. These instructions include deletion, duplication and passing through of the image element. Windowing is provided by inserting start-of-window and end-of-window instructions in the appropriate places in the sequence of rescaling instructions.

18 Claims, 3 Drawing Sheets

IMAGE PROCESSING SYSTEM

SCALING AND CLIPPING PROCESSOR

VIDEO COMPRESSION/EXPANSION PROCESSOR

OTHOGONAL ROTATION PROCESSOR

METHODS AND APPARATUS FOR DYNAMICALLY SCALING IMAGES

TECHNICAL FIELD

This invention relates to image processing systems and, more particularly, to methods and apparatus for selectively scaling digital signals representing displayable images.

BACKGROUND OF THE INVENTION

The advent of the information age has increased the need for storing, retrieving and processing such information. While alphanumeric text information can be efficiently encoded in a binary code representing each character, other types of information, such as pictures, graphs and other pictorial documents cannot readily be reduced to such simple coding schemes. Moreover, the enormous volume of data to be stored requires storage media of correspondingly high capacity. Optical storage systems such as microfilm, microfiche and optical disks offer the possibility of very large scale storage and retrieval. Such optical storage and retrieval systems are disclosed in Irazoqui patent 3,456,817, issued July 29, 1969, I. L. Lopata patent 3,804,498, granted Apr. 16, 1974, and I. L. Lopata patent 4,025,176, granted May 24, 1977.

One of the major difficulties in the use of such optical data storage and retrieval systems has been the necessity to operate upon stored images optically. While scaling, windowing, zooming and enlarging are all possible optically, the apparatus necessary to perform such operations are large, bulky, expensive and relatively slow. It has therefore become common to scan such optical images to convert the information content to electronic signals. Electronic processing techniques and equipment, and more particularly, digital processing techniques, can then be used to process the electronic images. By using integrated circuit techniques, the size and cost of the processing equipment can be radically reduced while, at the same time, increasing the speed and accuracy of the processing.

The types of processes which take place in such optoelectronic storage and retrieval systems include scanning an optical image to produce a bit stream of pixels divided into lines and frames, electronically compressing such pixel bit streams for efficient electronic storage or electronic transmission, re-expanding compressed images to restore the original bit stream for display, scaling the image size and/or resolution and clipping the resulting image if it is too large for the display device, and rotating the image. All of these processes are known and have been performed by programmed processors such as the Texas Instruments TI 34010 Graphics System Processor (GSP). Unfortunately, the speed at which such processes can be implemented is limited by the speed of the processor, the complexity of the operation, and the complexity of the electronic image. Moreover, since such processors are essentially serial machines, each such process must be completed before the next process can be begun. For these and other reasons, many electronic images cannot be manipulated in real time, that is, with no significant delay after being requested by the user. Such real time image manipulation is a highly desirable characteristic of an image processing system.

One of the most difficult operations to accomplish rapidly is to scale electronic images. Rescaling can be accomplished by decimating (or duplicating) the pixels in each scan line and decimating (or duplicating) the scan lines in each frame. Such decimation and duplication is relatively simple for simple scaling ratios such as two-to-one, where every other pixel and line can be duplicated or removed. Scaling ratios represented by irrational fractions, however, present difficult decimation and duplication problems. It has therefore become common to provide only a few, fixed, relatively simple, usually binary, scaling ratios. Unfortunately, many display devices and scanning devices have built-in resolutions which do not fit into the available scaling ratios. It would be convenient to be able to select the scaling ratio dynamically, depending on the needs of the user, and to select entirely arbitrary scaling ratios to fit the requirement of the available devices. Moreover, it would likewise be desirable to perform such scaling in real time, without significant delays in displaying the resulting image.

SUMMARY OF THE INVENTION

In accordance with the illustrative embodiment of the present invention, the processing necessary to prepare an electronic image of a displayed or printed page is accomplished in a serial pipeline including a plurality of different processes. The term "pipeline" indicates that the output of one process is fed directly to the input of the next process without the need for intermediate storage of the output. While some storage may be necessary to carry out the process itself, no inter-process storage and, more particularly, no storage of the full image is provided. Not only does this save on storage equipment, but also significantly speeds up the plurality of serial processes. Such processes include, but are not limited to, scanning, compressing, expanding, scaling, windowing and rotating electronic representations of images.

One of the more difficult processes to pipelines is the scaling process. What is meant by scaling is altering the number of pixels per line and/or the number of lines per frame in an image representation. In accordance with another aspect of the present invention, scaling is accomplished by compiling a sequence of simple duplication, deletion and pass through instructions and executing these scaling instructions in synchronism with the passage of the image data through the scaler. One advantage of the programmed scaling technique of the present invention is the speed at which the scaling process can be accomplished. Another advantage is that the provision of new and different scaling ratios does not require the reworking of the physical circuits of the scaling device. A further advantage is the ability to program any number of highly irrational scaling factors into the scaling circuits, in contrast to the prior art which provided hardwired circuits limited to a very few, simple scaling rations.

In accordance with one feature of the present invention, the sequence of scaling instructions is made up of repetitions of a relatively short kernel sequence which is repeated over and over.

In accordance with another feature of the present invention, windowing is provided in a programmed image scaling circuit by inserting window starting and window ending instructions in the sequence of scaling instructions.

In accordance with yet another feature of the present invention, the sequence of scaling and windowing instructions are compiled dynamically, in real time and on the fly, as the user specifies the desired scaling factors and/or window size and position.

BRIEF DESCRIPTION OF THE DRAWINGS

A complete understanding of the present invention may be gained by considering the following detailed description in conjunction with the accompanying drawing, in which.

To facilitate reader understanding, identical reference numerals are used to designate elements common to the figures.

DETAILED DESCRIPTION

Figure 1:
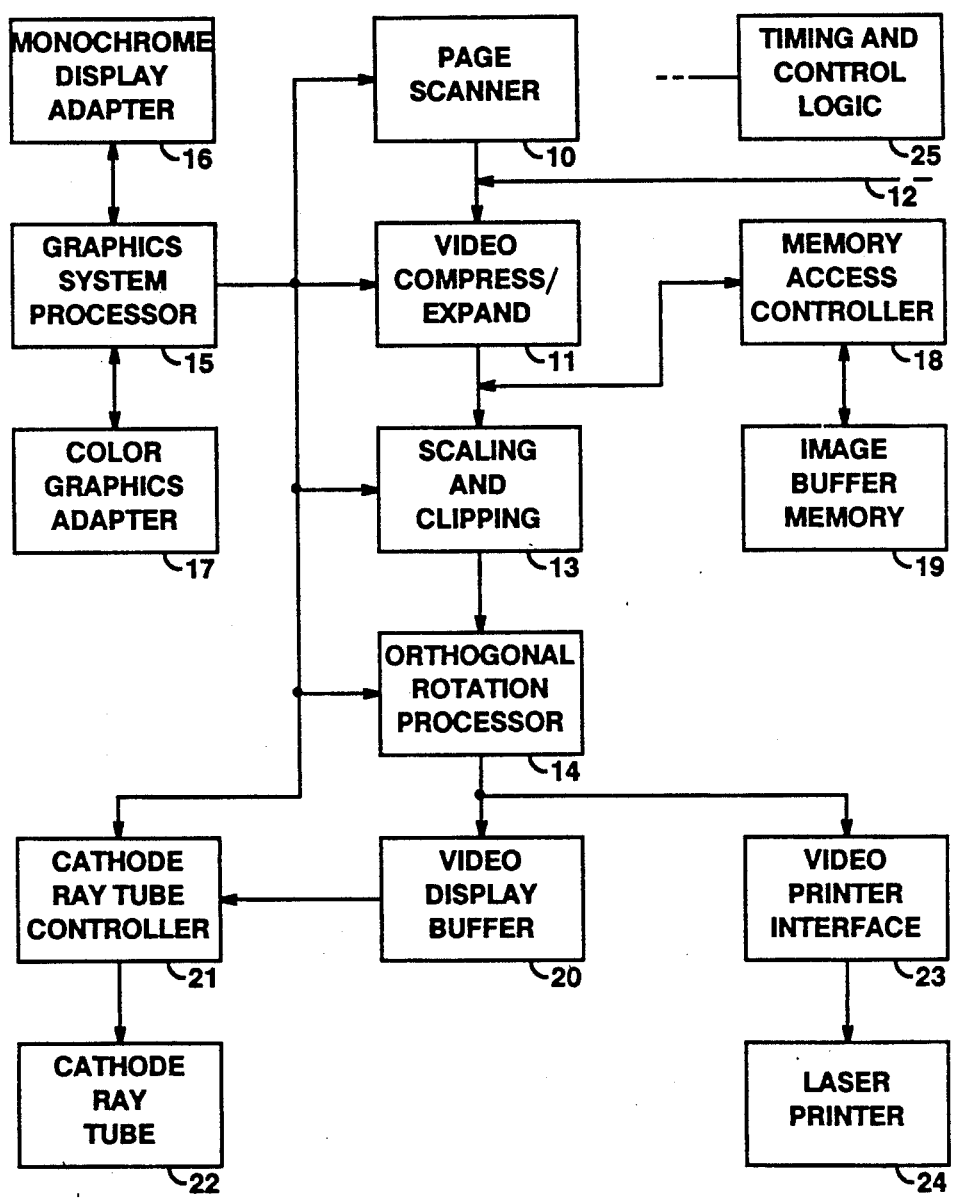
FIG. 1 shows a general block diagram of an image processing system in accordance with the present invention having a pipeline architecture.

In FIG. 1 there is shown a general block diagram of an image processing system comprising a page scanner 10. Scanner 10 can be any one of the optical scanners available in the prior art which optically scans a page of text or graphics and produces a serial binary bit stream which is applied to video compression and expansion circuit 11. Video compression and expansion circuit 11 uses any well-known digital compression technique such as run-length encoding, to compress the video image received from scanner 10 and store the compressed image in image buffer memory 19 by way of memory access controller 18. Previously stored images, or images generated by other devices, can be supplied to video compression and expansion circuit 11 by way of line 12. Memory 19 is a fast, random access storage device which acts as an intermediate storage buffer for a plurality of compressed digital images. A video compression and expansion circuit will be described in more detail in connection with FIG. 3.

Compressed images stored in memory 19 may be accessed and expanded by circuit 11 and passed on to scaling and clipping circuit 131. Alternatively, uncompressed images from scanner 10 or from line 12 can be passed directly to scaling and clipping circuit 13 without compression. Compression is useful for minimizing storage space or transmission time, but must be removed before further processing. Scaling and clipping circuit 13 rescales the number of pixels per line (N=horizontal resolution), and the number of lines per frame (M=vertical resolution), and clips the boundaries of the image to fit a desired display or reproduction device. It should be understood that the number of pixels per line and the number of lines per page is a design attribute of the page scanner 10 or of any other device which initially creates a digital page image. Display and printing devices similarly have inherent horizontal and vertical resolution parameters. Scaling and clipping circuit 13 serves to adapt an arbitrary resolution of the input image to match an arbitrary resolution of an output device. Scaling and clipping circuit 13 also serves to enlarge or reduce the size of a digital image by replicating or decimating input pixels and lines, and clipping the resulting image appropriately for the output device. A scaling and clipping circuit useful in the present invention will be described in more detail in connection with FIG. 2.

The output of scaling and clipping circuit 13 is applied to orthogonal rotation processor 14. Processor 14 performs the necessary operations on the input pixels to rotate the image by 90, 180 or 270 degrees. Such rotation circuits are well-known in the art, but one rotation circuit useful in the pipelined architecture of FIG. 1 will be described in connection with FIG. 4.

In accordance with the present invention, the four elements page scanner 10, video compression and expansion circuit 11, scaling and clipping circuit 13 and orthogonal rotation processor 14 operate in a pipeline manner under the control of graphics system processor 15. That is, intermediate storage between the processes carried out in blocks 10–14 is minimized and is substantially less than an entire digital image. The throughput of this digital processing string comprising blocks 10–14 is therefor minimized and, as a result, images are available for display or printing at a much faster rate than would be possible if full image intermediate storage were required at any point in the image processing string 10–14.

Elements 10–14 may be programmable, in which event graphics system processor 15 would produce the program code necessary to properly control these elements, or elements 10–14 may be hard-wired, in which case graphics system processor 15 would produce the necessary hard-wired control signals to properly control these elements. In either event, the image signals are processed a pixel at a time, a line at a time, or a very few lines at a time, and succeeding ones of elements 10–14 need not wait for a preceding element to complete the processing of an entire image before starting to process the same image. Indeed, all of elements 10–14 would, in many cases, be processing different parts of the same image at the same time. Graphics system processor 15 has, as an adjunct, a monochrome display adapter 16, if the image is to be displayed on a monochrome display device, or a color graphics adapter 17, if the image is to be displayed on a color display device. These display adapters are well-known in the art and will not be further described here.

It should be noted that not all of elements 10–14 need be involved in processing a particular image. In that event, the non-involved element can be entirely bypassed and the image immediately passed on to the next element. For example, if the image is received on line 12, page scanner 10 need not be used. Similarly, if the image is already in its expanded form, then video compression and expansion circuit 11 is not necessary to expand the image. If no change is required in the horizontal or vertical resolution of the image, scaling and clipping circuit 13 can be bypassed, and if no rotation is required, orthogonal rotation circuit 14 can be bypassed.

One convenient way to arrange the physical connections between the pipelined elements 10–14, as well as the graphics system processor 15, is to have all of the elements 10–15 share a data bus by means of which image signals and control signals can be passed between any two devices by simultaneously gating the signals onto and off of the bus by the sending and receiving elements, respectively. Such common bus systems are well-known and will not be further described here.

Using such a common bus, image signals can be passed between elements 10, 11, 12, 13, 14, 15, 19, 20 and 23 in any order desired, bypassing those elements not required for the currently processed image and including only the required elements.

The images from orthogonal rotation processor 14 can be passed to a video printer interface 23 and printed on a laser printer 24. Interface 23 matches the image data to the formats required by the printer 24 and passes this data on to printer 24 for printing. Alternatively, or simultaneously, the image data from orthogonal rotation processor 14 can be passed to video display buffer 20, which stores bit maps of images to be displayed on a cathode ray tube (CRT) 22. The bit map pixels in display buffer 20 are combined with CRT display control signals in cathode ray tube controller 21, and the resulting signal used to replenish the display on CRT 22. Cathode ray tube controller 21 is also under the control of graphics system processor 15, which provide the necessary horizontal and vertical synchronizing control signals to provide a proper display.

A timing and control logic circuit 25 provides appropriate timing signals to all of the other elements of FIG. 1. Such timing circuits are well-known in the art and hence will not be further described here.

Figure 2:
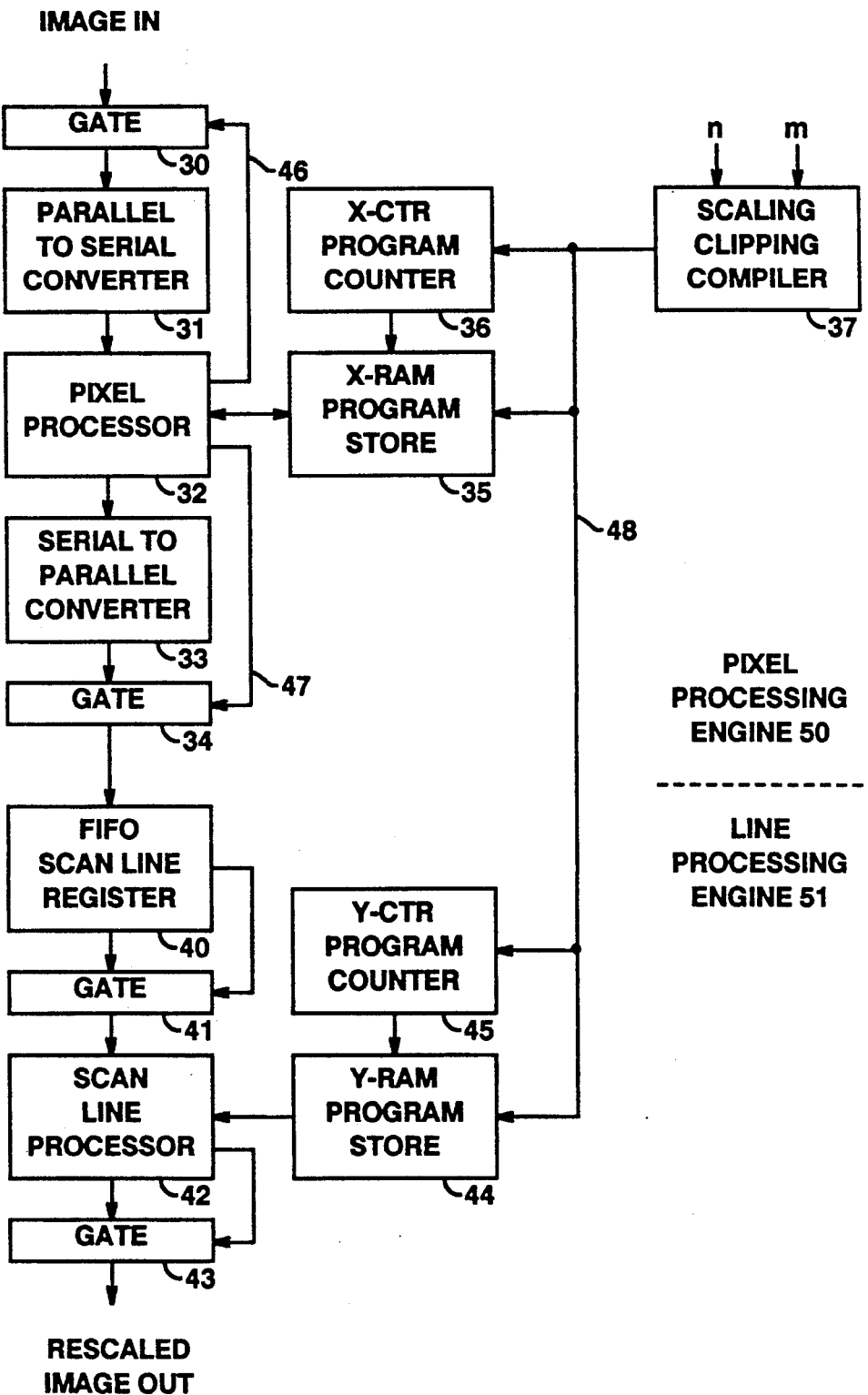
FIG. 2 shows a detailed block diagram of an image scaling and clipping circuit in accordance with the present invention, and useful in the image processing system of FIG. 1.

Referring to FIG. 2, there is shown a detailed block diagram of a scaling and clipping processor suitable for use as block 13 in FIG. 1. The processor of FIG. 2 comprises a pixel processing engine 50 and a line processing engine 51 connected in series. The input image data is supplied to gate 30 as parallel multibit words delivered from memory 19, from line 12, or from compression/expansion circuit 11 of FIG. 1. These multibit words are converted to a serial bit stream in converter 31 and delivered to pixel processor 32. By executing program instructions from X-RAM program store 35, under the control of instruction addresses from X-CTR program counter 36, pixel processor 32 processes the incoming pixels, one at a time, to provide the necessary replication or decimation of pixels to convert the incoming line from an incoming length, in pixels, to an outgoing length, in pixels. The outgoing pixels are applied to serial-to-parallel converter 33 to form the serial pixel bit stream into word-length groups. These word length groups are gated out of converter 33 by gate 34. Gates 30 and 34 are under the control of enabling signals from pixel processor 32 which, in turn, is driven by loading and unloading instructions from program store 35.

A scaling and clipping compiler 37 is supplied with the X-scaling ratio n and the y-scaling ratio m. Using these values, which may be entirely arbitrary, the compiler 37 compiles the sequence of instructions to be stored in program store 35 and executed by pixel processor 32 to produce the necessary change in the number of pixels per line. Compiler 37 is, of course, part of the graphics system processor 15 of FIG. 1. The number of different instructions required is extremely small, including most importantly instructions to delete a pixel, to duplicate the preceding pixel, or simply to pass a pixel to the output. The necessary change in number of pixels per line is accomplished by the simple expedient of mixing the delete and pass-on, or the duplicate and pass-on instructions in an appropriate ratio to accomplish the desired change. For many changes in the number of pixels per line, the sequence of instructions necessary to accomplish the translation is short and can be repeated over and over again until the entire line of pixels is translated. For more irrational translations, the repeatable sequence of instructions is longer and, in the extreme case, is not repeatable, but a single sequence is used to translate the entire line of pixels.

It can be seen that using the technique of compiling instructions for each translation, any arbitrary translation in the x-dimension can be accommodated. This is in contrast to prior art scalers which can accommodate only one or a few fixed conversion ratios, usually corresponding to powers of two. Moreover, because the instruction set is very limited, the compilation process is extremely fast and can be done on the fly as the conversion ratios are changed in real time. Alternatively, for standard and heavily used conversion ratios, the necessary instruction sequences can be stored permanently, either in program store 35 or in some other storage mechanism, and downloaded when needed or executed by loading counter 36 with the appropriate instruction address.

The converted pixel words from gate 34 are assembled into full image lines in first in-first out (FIFO) scan line register 40. When a full scan line is assembled in register 40, gate 41 is operated to transfer the scan line to scan line processor 42. Like pixel processor 32, scan line processor 42 acts on the scan line to delete the scan line, duplicate the scan line, or pass the scan line on. Processor 42 receives instructions from Y-RAM program store 44 under the control of Y-CTR program counter 45. Output lines from processor 42 are passed to the output by means of gate 43. Gates 41 and 43 are under control of processor 42 which is, in turn, under the control of loading and unloading commands in program store 44.

As with program store 35 and program counter 36, Y-RAM program store 44 and Y-CTR program counter 45 are loaded from compiler 37 with sequences of instructions which are necessary to make the necessary conversion. That is, the necessary ratio of delete and pass-on, or duplicate and pass-on, instructions are assembled in compiler 37 and down-loaded to program store 44. In this case, however, it is entire scan lines which are deleted, duplicated or passed on. Again, the sequence of instructions necessary to make arbitrary changes in the number of lines in the image can be of any length, but in each case only one such sequence need be compiled and then repeated as often as necessary to process all of the input lines.

The rescaling of images can result in the need to crop the resulting image so that it can fit on the display or reproduction device being used. This is most obvious when the image is enlarged ("zooming") to show more detail in one part of the image. In that case, it is necessary to discard all of the enlarged image which does not fit into the available display window. Rather than processing the entire image and then throwing away much of the processed signals, it is more efficient to process only those image signals which will ultimately fit into the display window. This is readily accomplished in the programmed scaler of the present invention.

More specifically, two program instructions are used to start and to stop the scaling process. Once the total sequence of instructions necessary to process an entire line are accumulated in program store 35, the instruction just before the start of the display window is replaced by a "start processing" instruction. Processor 32 does not respond to line processing instructions until it reaches this "start processing" instruction. Similarly, at the end of the display window, a "stop processing"

instruction replaces the instruction after the last display window instruction to terminate processing of the current image line.

On the other hand, the "start processing" trigger for the line processing engine 51 can be effected by setting Y-CTR program counter 45 to the twos complement of the number of lines above the display window. Counter 45 therefore counts off the number of lines before the display window before addressing the first line processing instruction in Y-RAM program store 44. Therefore no special start of window instruction is required for scan line processor 42. Since the program in Y-RAM program store 44 is only long enough to process the lines of the display window, no end of window instruction is required. Once the line processing instructions in program store 44 are exhausted, the scan line processor 42 ignores input scan lines until the next scan line trigger signal is delivered via line 48.

The specific instructions used in the pixel processing engine 50 are listed in TABLE 1.

TABLE 1

| PIXEL PROCESSOR INSTRUCTIONS | |
|---|---|
| CODE | DESCRIPTION |
| LOAD | Load a new 16-bit word into converter 30. |
| UNLD | Transfer an 8-bit byte from converter 33. |
| ONE | Pass the current pixel through without change. |
| ONER | Pass the current pixel through in reverse order. |
| DUP | Duplicate the current pixel. |
| DUPR | Duplicate the current pixel in reverse order. |
| DEL | Delete the current pixel. |
| SOW | Start of active window (left offset). |
| EOW | End of active window (window width). |
| SOS | Start of an instruction sequence (also loads). |
| NOP | No operation (used to align windows on word boundaries). |

The pixel processing engine 50 and the line processing engine 51 are controlled entirely by instructions downloaded into program store 35 from compiler 37. These instructions are initially generated by specifying the desired image scaling factors and later these instruction sequences are modified to identify the start and the end of the active window regions. The ratio of the scale factor n in the x-direction and the scale factor m in the y-direction is called the aspect ratio. The aspect ratio can take on any value, and is not restricted to a 1:1 ratio.

For most scaling factors, the instruction sequences repeat themselves on some input word boundary. The amount of memory required to store the instruction sequence can be minimized by recognizing these repetitions explicitly by placing an SOS (start of sequence) instruction at the beginning of each repetitive sequence. Only one copy of a repetitive sequence for a particular scaling factor need be downloaded into the program store 35 and then duplicated as many times as required to process an entire image.

Once these instructions are in program store 35, they are modified by overlaying the pixel processing instructions with window starting (SOW) and window stopping (EOW) instructions. That is, at the last pixel before the start of the x-window, an SOW instruction is inserted into the code sequence, replacing whatever other instruction is there. Similarly, an EOW instruction is inserted into the code sequence, replacing whatever other instruction follows the last pixel processing instruction at the end of the window. The replaced instructions can be saved for later restoration if the clipping window is to be later moved without changing the scale factor.

Returning to FIG. 2, the gate 30 is operated each time a LOAD instruction is encountered in the code sequence. Gate 34 is operated each time an UNLD instruction is encountered. A SOS (start of sequence) instruction acts like a LOAD instruction, operating gate 30. Each LOAD instruction loads a 16-bit word into parallel to serial converter 31. The serial bits are then applied, one at a time, to pixel processor 32. In processor 32, the pixel is either passed through (ONE instruction), duplicated (DUP instruction) or deleted (DEL instruction). Each complete scan line consists of a left clipping region, from the start of the scan line to the start of the active x-window, the region within the active x-window, and the right clipping region from the end of the active x-window to the end of the scan line. The instruction sequence is just as long as is required to process all of the pixels in a scan line, and then is repeated for successive scan lines. In the event that no window clipping is required, the first instruction in each sequence is replaced by an SOW (start of window) instruction. Each assembled byte of eight output bits is gated by an UNLD command to the FIFO register 40 of scan line processor 51.

The compiler 37 assembles ONE and DUP instructions (or ONE and DEL instructions) in proportion to the scaling ratio. In addition, the compiled pixel processor command sequence must follow the following rules:

1. An SOS command must start each repetitive sequence.
2. A LOAD command must start each word subsequence.
3. A LOAD or an SOS command must be entered following each 16 occurrences of the DEL, ONE or ONER commands, since each of these instructions consumes one input pixel.
4. An UNLD command must follow each 8 occurrences of the DUP or ONE (or DUPR or ONER) commands, since each of these commands generates one output pixel.
5. The DUP, DEL and ONE commands (or the DUPR, DEL, and ONER commands) can be mixed in whatever order and in whatever proportion that is needed to effect the desired scale factor.
6. The start of the window in the x-direction is marked by the insertion of a SOW command. Processor 32 ignores UNLD commands from the beginning of the scan line to the occurrence of the SOW command.
7. The size of the window in the x-direction must include an even number of UNLD commands (output bytes) to permit the appropriate assembly of scan lines in the scan line engine 51 of FIG. 2. The EOW command is inserted right after the last UNLD command in the window. Thereafter, the processor 32 will ignore commands until the end of line signal is received. The end of scan line signal resets the program counter 36.

In order to better understand the compilation process, a typical x-code sequence will now be shown. Assuming that the input image consists of 15 scan lines of 128 pixels each, an x-direction scale factor of 2:5 is required while a y-direction scale factor of 2:3 is required. The sequence of x-codes required for the pixel processor 32 is as shown in TABLE 2.

TABLE 2

| X-Direction Scaling Code Sequence for 2:5 Scale Factor | | | | | |
|---|---|---|---|---|---|
| SEQ. NO. | CODE | SEQ. NO | CODE | SEQ. NO. | CODE |
| 0 | NOP | | | | |

TABLE 2-continued

X-Direction Scaling Code Sequence for 2:5 Scale Factor

| SEQ. NO. | CODE | SEQ. NO | CODE | SEQ. NO. | CODE |
|---|---|---|---|---|---|
| 1 | SOS | | | 38 | ONE |
| 2 | ONE | 20 | DEL | 39 | DEL |
| 3 | DEL | 21 | ONE | 40 | ONE |
| 4 | DEL | 22 | UNLD | 41 | DEL |
| 5 | ONE | 23 | DEL | 42 | DEL |
| 6 | DEL | 24 | ONE | 43 | ONE |
| 7 | ONE | 25 | DEL | 44 | UNLD |
| 8 | DEL | 26 | DEL | 45 | DEL |
| 9 | DEL | 27 | ONE | 46 | ONE |
| 10 | ONE | 28 | DEL | 47 | DEL |
| 11 | DEL | 29 | ONE | 48 | DEL |
| 12 | ONE | 30 | DEL | 49 | ONE |
| 13 | DEL | 31 | DEL | 50 | DEL |
| 14 | DEL | 32 | ONE | 51 | ONE |
| 15 | ONE | 33 | DEL | 52 | DEL |
| 16 | DEL | 34 | ONE | 53 | DEL |
| 17 | ONE | 35 | DEL | 54 | LOAD |
| 18 | LOAD | 36 | LOAD | 55 | ONE |
| 19 | DEL | 37 | DEL | 56 | DEL |

This pattern requires a large number of codes until it repeats itself, due to the non-binary scale factor. Note that the ONE commands and DEL commands are present in the 2.5 ratio required for proper rescaling. The LOAD and UNLD commands are also in the proper place to insure timely loading of 16-bit input words and unloading of 8-bit output words. The windowing commands have not yet been introduced into this sequence, but their position can be readily calculated by counting the appropriate number of UNLD commands to get to the start of the window (to insert the SOW command) and the appropriate number of further UNLD commands to get to the end of the window (to insert the EOW command).

The number of instructions required for the scan line processor 42 is fewer since this processor processes entire scan lines. FIFO scan line register 40 operates to assemble eight-bit input bytes into entire scan lines without programming since these parameters are set by the input scan line marker, which always corresponds to the pixel processor EOW command. This EOW command is loaded into register 40 along with the final byte of the display window and is used as a signal to transfer the scan line to scan line processor 42. The processor 42 operates in two modes. The first mode corresponds to the scan lines occurring before the active y-window begins. This is determined by setting the Y-CTR program counter 45 to the twos complement of the number of scan lines to be initially clipped. Thus, counter 45 does not reach the initial (0) count until after the clipped lines have been discarded. The second mode corresponds to all of the scan lines after the start of the active y-window. The scan lines are processed during this interval in accordance with the program in program store 44. This program is compiled to process the number of scan lines needed to make up the y-window, at which point an end of window sequence (EOS) instruction is inserted. Thereafter, input scan lines are discarded until the next end of scan line signal reinitiates the process.

The line scan processing y-code sequences are similar to the x-code sequences, but require fewer codes and are typically shorter code sequences. The required scan line processing instructions are shown in TABLE 3.

TABLE 3

SCAN LINE PROCESSOR INSTRUCTIONS

| CODE | DESCRIPTION |
|---|---|
| ONE | Copy scan line from input to output. |
| DUP | Duplicate the previous scan line. |
| DEL | Delete the previous scan line. |
| EOS | End of active window sequence (window height). |

In order to better understand the scan line compilation process, a typical code sequence will now be shown. Assuming again that the input image consists of 15 scan lines of 128 pixels each, an x-direction scale factor of 2:5 is required while a y-direction scale factor of 2:3 is required. In order to produce the 2:3 scale factor in the y-direction, the code sequence shown in TABLE 4 can be used.

TABLE 4

Y-Direction Code Sequence for 2:3 Scaling Factor

| SEQ. NO. | CODE |
|---|---|
| 0 | ONE |
| 1 | ONE |
| 2 | ONE |
| 3 | ONE |
| 4 | ONE |
| 5 | DEL |
| 6 | ONE |
| 7 | ONE |
| 8 | DEL |
| 9 | ONE |
| 10 | ONE |
| 11 | EOS |

Note that this sequence aborts with the EOS command two lines before the end of the input image, and these last two lines are discarded as part of the clipped image.

Figure 3:
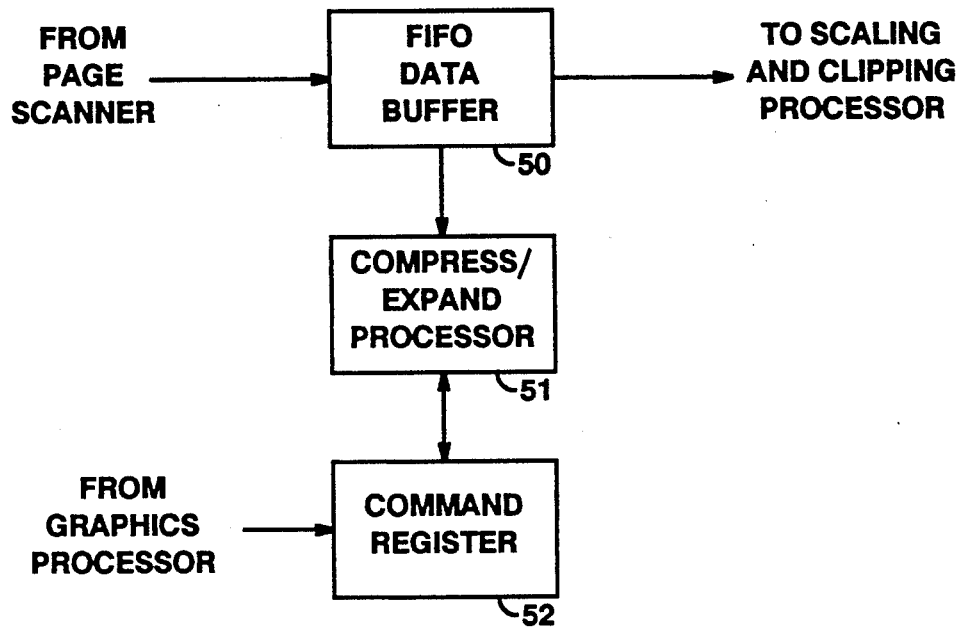
FIG. 3 shows a detailed block diagram of an image compression and expansion circuit useful in the image processing system of FIG. 1.

In FIG. 3 there is shown a detailed block diagram of a video compression and expansion circuit useful for element 11 in FIG. 1. A FIFO (first in, first out) data buffer 50 receives expanded image data from page scanner 10 (or line 12) or receives compressed image data from buffer memory 19 (or line 12) and delivers compressed image data to buffer memory 19 (or line 12) or delivers expanded image data to scaling and clipping processor 13 (or line 12 or rotation processor 14). Image data in buffer 50 is transferred, a block at a time, to compressor/expandor processor 51. Processor 51 is under the control of commands in a command register 52 which, in turn, is downloaded from graphics processor 15 (FIG. 1). Processor 51 may comprise any known image rotating circuit such as the AMD 95C71 Video Compression/Expansion Processor available from the AMD company.

The programmed control of processor 51 is effected through 16-bit program instructions in command register 52. The meaning of the various bits of each command word in register 52 is shown in TABLE 5.

TABLE 5

Compressing/Expansion Command Word Bit Assignments

| BITS | CODE | DESCRIPTION |
|---|---|---|
| 15 | GO | Start processing. |
| 14-11 | OM | Operation mode (compression or expansion). |
| 10 | LM | Line mode (single or multiple). |
| 9 | BM | Boundary mode (even or odd). |
| 8 | IE | Interrupt enable. |
| 7 | CW | Compressor word boundary (odd or even). |
| 6 | SC | Source Control. |
| 5 | DC | Destination control (scaler or rotator). |
| 4 | — | Reserved. |
| 3 | AB | Abort current process. |

TABLE 5-continued

| Compressing/Expansion Command Word Bit Assignments | | |
|---|---|---|
| BITS | CODE | DESCRIPTION |
| 2 | PC | Page control. |
| 1 | LC | Line complete. |
| 0 | DE | Data error. |

Figure 4:
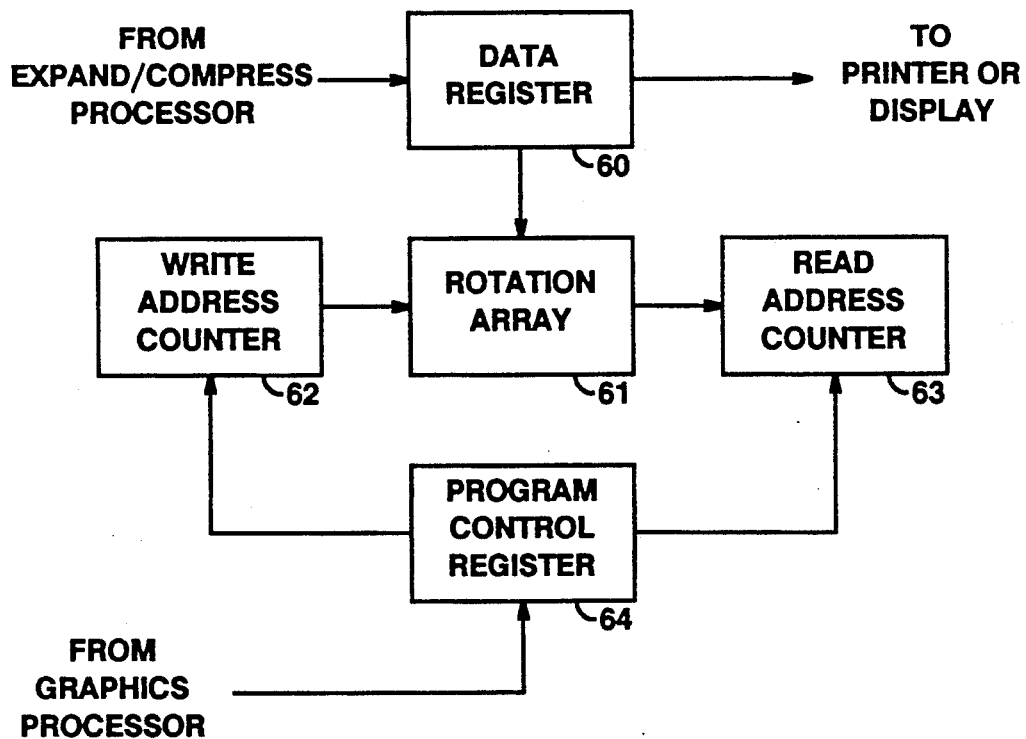
FIG. 4 shows a detailed block diagram of an image orthogonal rotation circuit useful in the image processing system of FIG. 1.

In FIG. 4 there is shown a detailed block diagram of an orthogonal rotation circuit useful for rotation processor 14 in FIG. 1. The orthogonal rotation circuit of FIG. 4 comprises a data register 60 which receives 16-bit image data words from one of the other processors of FIG. 1. These image data words are assembled into a 64 by 64 bit array in memory array 61, using the write addresses supplied by write address register 62. Once array 61 is filled, read address register 63 is used to read out the contents of array in such a fashion as to effect the amount of rotation desired. For example, 90 degree rotation is effected by reading out a column at a time after writing in the data a row at a time. A 180 degree rotation is effected by reading the rows out in the reverse order to the order in which they were written in. Finally, a 270 degree rotation is effected by reading the columns of data out in the reverse order. Address registers 62 and 63 are under the control of program control register 64 which, in turn, is programmed from graphics system processor 15 of FIG. 1.

The programmed control of the orthogonal rotation processor of FIG. 4 is effected through 16-bit program instructions in command register 64. The meaning of the various bits in each command word in register 64 is shown in TABLE 6.

TABLE 6

| Rotation Command Word Bit Assignments | | |
|---|---|---|
| BITS | CODE | DESCRIPTION |
| 15 | EN | Enable data input transfer operations. |
| 14 | FC | Enable data output transfer operations. |
| 12-13 | — | Reserved. |
| 11 | CLP | Word transfer complete. |
| 9-10 | RT | Rotation mode identifier (90, 180, 279). |
| 8 | RW | Read-Write Enable. |
| 2-7 | YAR | Array size y-dimension. |
| 0-1 | XAR | Array size x-dimension. |

It should also be clear to those skilled in the art that further embodiments of the present invention may be made by those skilled in the art without departing from the teachings of the present invention.

What is claimed is:

1. A rescaling system for digital image processing comprising
    programmable pixel processing means responsive to patterns of repeat, delete and pass through pixel processing instructions to process the pixels in each scan line of said image,
    programmable scan line processing means responsive to patterns of repeat, delete and pass through scan line processing instruction to process the scan lines previously processed by said pixel processing means, and means for dynamically programming said programmable pixel processing means and said programmable scan line processing means to rescale said digital image by generating said patterns on the fix,
    said pixel processing means and said scan line processing means each comprising
    a program store for storing said processing instructions,
    a program counter, and
    means responsive to said program counter for accessing and executing processing instruction from said program store.

2. The rescaling system according to claim 1 further comprising
    means for inserting window delineating instructions in said patterns of instructions.

3. The rescaling system according to claim 1 wherein said pixel processing means further comprises
    a parallel-to-serial converter for converting parallel digital signals representing said image into a single serial pulse train,
    a pixel replicating, deleting or transmitting circuit connected to said parallel to serial converter, and
    a serial-to-parallel converter for converting the serial output of said pixel replicating, deleting or transmitting circuit into parallel digital signals.

4. The rescaling system according to claim 1 wherein said scan line processing means comprises
    means for assembling digital image signals from said pixel processing means into complete scan lines,
    a scan line replicating, deleting or transmitting circuit connected to said assembling means, and
    means for untilizing the rescaled image from said scan line replicating, deleting or transmitting circuit.

5. An processing system for processing electronic representations of an image comprising lines of pixels and frames of lines, said system comprising
    programmable means for processing each pixel of a line, one pixel at a time,
    programmable means for processing each line of a frame, one line at a time, and
    means for connecting said line processing means to the output of said pixel processing means,
    each of said programmed means comprising
    a program store,
    a program counter,
    means responsive to said program counter for accessing and executing instructions from said program store, and
    means for dynamically programming said programmable means for processing each pixel of a line and programmable means for processing each line of a frame to rescale said digital image by generating repeat, delete, and pass through patterns on the fly.

6. The processing system according to claim 5 further comprising
    means for delineating the boundaries of a viewing window for said image, and
    means for disabling the processing of those portions of said image outside of said boundaries.

7. The processing system according to claim 5 wherein said means for replicating, deleting or transmitting said input further comprises
    means for establishing occurrence patterns of said replication, deletion and transmission through de-termined by desired rescaling factors.

8. A method for rescaling digital image information comprising the steps of
    storing program instructions in a program store,
    sequentially accessing said program instructions,
    processing pixels with a program that contains patterns of repeat, delete and pass through pixel processing instructions to process the pixels in each scan line of said image, processing scan lines with a program that contains patterns of repeat, delete and pass through scan line processing instructions to process scan lines from said step of processing pixels, and dynamically programming for said pixel and scan line programs to rescale said digital image by generating said patterns on the fly.

9. The method according to claim 8 further comprising the step of inserting window delineating instructions into said programs of instructions.

10. The method according to claim 8 wherein said step of processing pixels further comprises the steps of converting parallel digital signals representing said image into an input serial pulse train, replicating, deleting or transmitting pixels from said serial pulse train to form an output serial pulse train, and converting said output serial pulse train into parallel digital signals.

11. The method according to claim 8 wherein said step of processing scan lines further comprises the steps of assembling digital scan line from processed pixels, replicating, deleting or transmitting assembled scan lines, and utilizing the rescaled image derived from said step of replicating, deleting or transmitting scan lines.

12. An image processing system comprising an image compressing and expanding processor, a programmable rescaling processor responsive to patterns of repeat, delete, and pass through commands, an image rotation processor, means for connecting said compressing, said rescaling and said rotation processors seriatim in a pipeline architecture where each said processor can begin processing an image before the previous processor has completed the processing of said image, and means for dynamically programming said programmable rescaling processor to rescale said digital image by generating said patterns on the fly.

13. The image processing system according to claim 12 further comprising a page scanning processor for generating image data by scanning the contents of a page of graphic material.

14. The image processing system according to claim 12 further comprising a printer for printing paper a copy of an image after processing by said compressing, said rescaling, or said rotation processor.

15. The image processing system according to claim 12 further comprising a cathode ray tube device for displaying a copy of an image after processing by said compressing, said rescaling, or said rotation processor.

16. A dynamically programmable digital image processor comprising programmable means for expanding, rescaling, and rotating digitally represented images, means for controlling said programmable means so as to permit simultaneous expanding, rescaling, and rotating different parts of the same digital image, means for dynamically programming said programmable rescaling means to rescale said digital image by generating repeat, delete, and pass through patterns on the fly, and means for displaying said digital image.

17. The digital image processor according to claim 16 further comprising page scanning means for converting a page of graphics into a digital representation of an image of said page for processing by said programmable means.

18. The digital image processor according to claim 16 further comprising digital image storage means, and programmable image compressing means for compressing digital images for storage in said digital image storage means.

* * * * *